(12) United States Patent
Maity et al.

(10) Patent No.: US 8,560,368 B1
(45) Date of Patent: Oct. 15, 2013

(54) AUTOMATED CONSTRAINT-BASED SCHEDULING USING CONDITION-BASED MAINTENANCE

(75) Inventors: Ashis K. Maity, Oviedo, FL (US);
David Zaremby, Orlando, FL (US);
David McMullen, Orlando, FL (US);
Juan M. Gomez, Winter Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/299,740

(22) Filed: Nov. 18, 2011

(51) Int. Cl.
*G06Q 10/00* (2012.01)
(52) U.S. Cl.
USPC ........................................ 705/7.13
(58) Field of Classification Search
USPC ........................................ 705/7.13
See application file for complete search history.

(56) References Cited

U.S. PATENT DOCUMENTS

| | | | | |
|---|---|---|---|---|
| 7,496,475 | B2 * | 2/2009 | Byrne et al. | 702/184 |
| 7,937,280 | B1 * | 5/2011 | Leung et al. | 705/6 |
| 2004/0162811 | A1 * | 8/2004 | Wetzer et al. | 707/2 |
| 2009/0089092 | A1 | 4/2009 | Johnson et al. | |
| 2009/0171871 | A1 | 7/2009 | Zhang et al. | |
| 2009/0287530 | A1 * | 11/2009 | Watanabe et al. | 705/9 |
| 2010/0077046 | A1 * | 3/2010 | Rigal et al. | 709/206 |
| 2012/0000858 | A1 | 1/2012 | Butler et al. | |
| 2012/0059684 | A1 * | 3/2012 | Hampapur et al. | 705/7.28 |
| 2012/0130759 | A1 * | 5/2012 | Davenport et al. | 705/7.12 |
| 2012/0203564 | A1 | 8/2012 | Myr | |

OTHER PUBLICATIONS

"The six methods for estimating task duration," Projectmanagementforum's Blog, Jun. 24, 2010, 5 pages.
Wang, H. et al., "Software project level estimation model framework based on Bayesian Belief Networks," Proceeding QSIC '06 Proceedings of the Sixth International Conference on Quality Software, 2006, pp. 209-218.
Hill, J. et al., "Expert's estimates of task durations in software development projects," International Journal of Project Management, vol. 18, 2000, pp. 13-21.
Berlin, S. et al., "Comparison of estimation methods of cost and duration in IT projects," Information and Software Technology, vol. 51, Iss. 4, Apr. 2009, pp. 738-748.
Fromherz, M., "Constraint-based scheduling," American Control Conference, Arlington, VA, Jun. 2001, 14 pages.
Carlsson, M. et al., "Finite domain constraint programming systems," 2002, 23 pages.
Rudova, H. et al., "Constraint-based scheduling: Introduction," May 2009, 22 pages.
Fulton, S. et al., "ISMI consensus preventive and predictive maintenance vision guideline: Version 1.1," International SEMATECH Manufacturing Initiative, Nov. 20, 2007, 26 pages.

(Continued)

*Primary Examiner* — Mark A Fleischer
(74) *Attorney, Agent, or Firm* — Withrow & Terranova, PLLC

(57) ABSTRACT

An automated constraint-based scheduler that uses condition-based information is disclosed. A scheduler module generates a maintenance schedule for one or more components. The scheduler module receives time-based maintenance information associated with a component and condition-based maintenance information that identifies a determined condition of the component. A plurality of constraints associated with performing maintenance on the component is determined. The scheduler module uses a constraint-based scheduler to generate a maintenance schedule for the component based on the time-based maintenance information, the condition-based maintenance information, and the plurality of constraints.

18 Claims, 6 Drawing Sheets

(56) References Cited

OTHER PUBLICATIONS

"'New generation' asset management/maintenance management," Senergy, http://www.mysenergy.com/en/brochure/Senergy_technology.pdf, published as early as Sep. 15, 2011, 2 pages.

Reimann, J. et al., "Using condition based maintenance to improve the profitability of performance based logistics contracts," Annual Conference of the Prognostics and Health Management Society, Sep. 27-Oct. 1, 2009, 9 pages.

"Welcome to the IFCS—Senergy EAM/CMMS website," Senergy, http://www.mysenergy.com/, published as early as Sep. 15, 2011, 3 pages.

Lofall, D. et al., "Integrating CMMS with predictive maintenance software," DLI Engineering Corporation, http://www.azimadli.com/downloads/integrating%20cmms.pdf, published as early as Sep. 15, 2011, 3 pages.

Department of Defense, "Condition based maintenance plus (CBM+) for materiel maintenance," No. 4151.22, Dec. 2, 2007, 11 pages.

U.S. Army, "CBM+Roadmap," Dec. 13, 2007, 88 pages.

Harrison, G. A. et al., "CBM+system for ship condition monitoring," Fourteenth International Ship Control Systems Symposium, Ottawa, Canada, Sep. 21-23, 2009, 10 pages.

Harrison, G. et al., "Prognostic algorithms in condition based maintenance," 2010 NDIA Ground Vehicle Systems Engineering and Technology Symposium, Dearborn, Michigan, Aug. 17-19, 2010, 7 pages.

Das, S. et al., "CBM+ for helicopter health management," Paper #121, European Rotorcraft Forum, Paris, France, Sep. 7-10, 2010, 8 pages.

Harris, M. et al., "Augmenting fielded test systems with diagnostic reasoner technology," Proceedings of the IEEE Autotestcon, Sep. 17-20, 2007, pp. 123-128.

Jaffar, J. et al., "Constraint logic programming: a survey," Journal of Logic Programming, May 1994, 84 pages.

Schulte, C. et al., "Modeling and programming with Gecode," Aug. 29, 2011, 450 pages.

Schulte, C. et al., "Programming constraint inference engines," Proceedings of the Third International Conference on Principles and Practice of Constraint Programming, Hagenberg, Austria, Oct. 1997, 15 pages.

Senkul, P. et al., "An architecture for workflow scheduling under resource allocation constraints," Information Systems, vol. 30, Jul. 2005, pp. 399-422.

Schulte, C. et al., "Finite domain constraint programming systems," Chapter 14 of Handbook of Constraint Programming, 2006, pp. 495-526.

Non-final Office Action for U.S. Appl. No. 13/599,576 mailed May 13, 2013, 14 pages.

\* cited by examiner

AUTOMATED CONSTRAINT-BASED SCHEDULING USING CONDITION-BASED MAINTENANCE

FIELD OF THE DISCLOSURE

The present disclosure relates generally to constraint-based scheduling, and in particular, to constraint-based scheduling of one or more components for maintenance based on both time-based maintenance information and condition-based maintenance information.

BACKGROUND

Machinery is traditionally serviced at recommended periodic intervals based on predetermined guidelines. For example, an automobile manufacturer may recommend that the oil be replaced in a vehicle every 7,500 miles. However, under certain conditions, the oil in the vehicle may not actually need replacing at the 7,500 mile interval, while under other conditions; the oil might actually need to be changed at 4,000 miles. In the former situation, the vehicle is taken out of service sooner than necessary, and costs are expended to replace oil which did not need replacing. In the latter situation, the life of the engine may be compromised because the oil was not replaced as soon as it should have been.

Increasingly, companies are using condition-based maintenance (CBM) (sometimes referred to as predictive maintenance) to determine when a machine should be serviced. CBM uses one or more inputs, such as sensor data identifying real-time characteristics of the machine, historical maintenance of the machine, and the like, to predict whether a particular machine needs maintenance. One goal of CBM is to more closely align the need for maintenance with the actual maintenance of the machine. For example, in the case of changing the oil in a vehicle as discussed above, the vehicle may be equipped with one or more sensors that sense the condition of the oil in the vehicle. The sensors may be able to quantify attributes or characteristics of the oil, such as the viscosity of the oil, the percentage of impurities in the oil, and the like, which may be used to predict or otherwise determine whether or not the oil in the particular vehicle needs replacing. CBM information may at times be consistent with preventive maintenance guidelines, it may be inconsistent with preventive maintenance guidelines, or it may simply indicate a need to service a component on a machine independent of preventive maintenance guidelines that indicate a need to service another component on the machine.

Many large scale distributed organizations need to continually maintain complex machines. Non-limiting examples include package delivery services, airlines, and the military. Such organizations typically have a full-time maintenance function that includes multiple maintenance facilities, many full-time service technicians assigned to particular facilities, parts located in the various facilities, and the like. Such organizations are increasingly using both time-based maintenance information to generate work orders that identify a needed service for a machine, and CBM information to generate work orders that predict or otherwise determine a need for service for a machine. This results in a large number of work orders that are associated with a large number of machines, wherein some of the work orders may be duplicative, some may be complementary, and some may be independent of one another.

Generally, the logistics associated with maintaining a large number of machines are constraint-based. For example, there are a number of machines that need maintaining, that may at different points in time be located in proximity to different maintenance facilities. At those facilities, there may be a limited number of technicians, and each technician may have certain limiting qualifications that permit them to work only on certain maintenance procedures. Further constraints may be that each technician can only work so many hours a day, there a finite number of parts located at particular facilities, etc.

Generating a maintenance schedule that takes work orders based on time-based information and work orders based on CBM information into consideration, in conjunction with the constraints associated with maintaining a large number of complex machines is a daunting task. Accordingly, there is a need for an automated constraint-based scheduler that reconciles the different types of work orders, takes the many constraints associated with maintaining large numbers of machines into consideration, and generates a maintenance schedule based on such information upon demand.

SUMMARY

The present disclosure relates to constraint-based scheduling. In one embodiment, an automated scheduler module uses a constraint-based scheduler to generate a maintenance schedule for one or more components that make up one or more items, such as machines. In particular, the scheduler module receives time-based maintenance information associated with a component, and condition-based maintenance (CBM) information that identifies a determined condition of the component. The time-based information may comprise, for example, a first work order for the component that identifies a first maintenance task based on a predetermined guideline associated with the component. The CBM information may comprise, for example, a second work order that identifies a second maintenance task based on the determined condition of the component. The automated scheduler module also determines a plurality of constraints associated with performing maintenance on the component. Such constraints may include, for example, a finite number of facilities for performing the maintenance tasks, limited time-frames at such facilities for performing the maintenance tasks, limitations on which technicians, sometimes referred to herein as maintainers, are qualified to perform such maintenance tasks, and the like. Based on the time-based maintenance information, the CBM information and the plurality of constraints, the automated scheduler module uses a constraint-based scheduler to generate a maintenance schedule for the one or more components.

The scheduler module may use prioritization information in the generation of the maintenance schedule. Such prioritization information identifies some information as having a higher priority than other information. For example, the prioritization information may identify the CBM information as having a higher priority than the time-based information, since the CBM information is based on the latest information relating to a condition of the component, and the time-based information is based on predetermined guidelines.

The scheduler module may also, based on the CBM information, alter time-based information. For example, based on CBM information, the scheduler module may alter time-based information to specify that a component should be scheduled for preventive maintenance at a later date than the component is originally scheduled for preventive maintenance.

The scheduler module may be coupled to other maintenance-related functions, such as an inventory control function. The scheduler module, based on the time-based information and CBM information, may determine a need for a particular part. The scheduler module may determine that the particular part is not in stock, and automatically generate a message that indicates a need to order the particular part. Alternatively, the scheduler module may generate a message that actually orders the particular part.

The scheduler module may also utilize one or more maintenance schedule optimization criteria, or factors, to generate the maintenance schedule. Such criteria may include, for example, one or more of a least cost criterion, a fewest mechanics criterion, a uniformly distributed workload criterion, a shortest timeframe criterion, and the like. A user may operate the scheduler module successive times using different optimization criteria to generate different maintenance schedules that are optimized for the respective selected criteria.

In another embodiment, the scheduler module uses the constraint-based scheduler to generate a maintenance schedule for a plurality of items that comprise a plurality of components. Such items may be any type of machine that is made up of components, and that requires maintenance over time, such as a vehicle, an airplane, a helicopter, a tank, or the like. Time-based maintenance information that identifies a first plurality of components of the plurality of components as requiring maintenance, and condition-based maintenance information that identifies a determined condition of a second plurality of components is received. A plurality of constraints associated with performing maintenance on the first plurality of components and the second plurality of components is determined. The scheduler module, based on the time-based maintenance information, the condition-based maintenance information, and the plurality of constraints, uses the constraint-based scheduler to generate a maintenance schedule for the plurality of items.

Among other features, the scheduler module disclosed herein assimilates multiple time-based work orders and CBM-based work orders, determines dependencies and relationships between such work orders, and reconciles such work orders to, for example, eliminate duplicative work orders. Based on this information and the constraints associated with performing maintenance on machines, such as available facilities, location of the machines, availability of maintainers, availability of parts, and desired time frame for performing the maintenance, generates a maintenance schedule upon demand. The scheduler module disclosed herein may be repeatedly executed using different optimization criteria to generate different maintenance schedules for the same components, resulting in a maintenance schedule based on desired criteria. Different optimization criteria can be combined as well using various weights or factors amongst individual optimization criterion. For example, a schedule may be obtained that is optimized based 40% on a shortest timeframe criterion and 60% on a uniformly distributed workload criterion.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and to illustrate the best mode of practicing the disclosure. Upon reading the following description and in light of the accompanying drawings, those skilled in the art will understand the concepts of the disclosure and will recognize applications of these concepts not particularly addressed herein. It should be understood that these concepts and applications fall within the scope of the disclosure and the accompanying claims.

The present disclosure relates to constraint-based scheduling. In one embodiment, an automated scheduler module generates a maintenance schedule for one or more components that make up one or more items, such as machines. In particular, the automated scheduler module receives time-based maintenance information associated with a component and condition-based maintenance (CBM) information (sometimes referred to as predictive maintenance information) that is based on a determined condition of the component. The time-based information may comprise, for example, a first work order for the component that identifies a first maintenance task based on a predetermined preventive maintenance guideline associated with the component. The CBM information may comprise, for example, a second work order that identifies a second maintenance task based on the determined condition of the component. The automated scheduler module also determines a plurality of constraints associated with performing maintenance on the component. Such constraints may include, for example, a finite number of facilities for performing the maintenance tasks, limited timeframes at such facilities for performing the maintenance tasks, limitations on which maintainers are qualified to perform such maintenance tasks, and the like. The automated scheduler module uses a constraint-based scheduler based on the time-based maintenance information, the CBM information and the plurality of constraints to generate a maintenance schedule for the one or more components.

Figure 1:
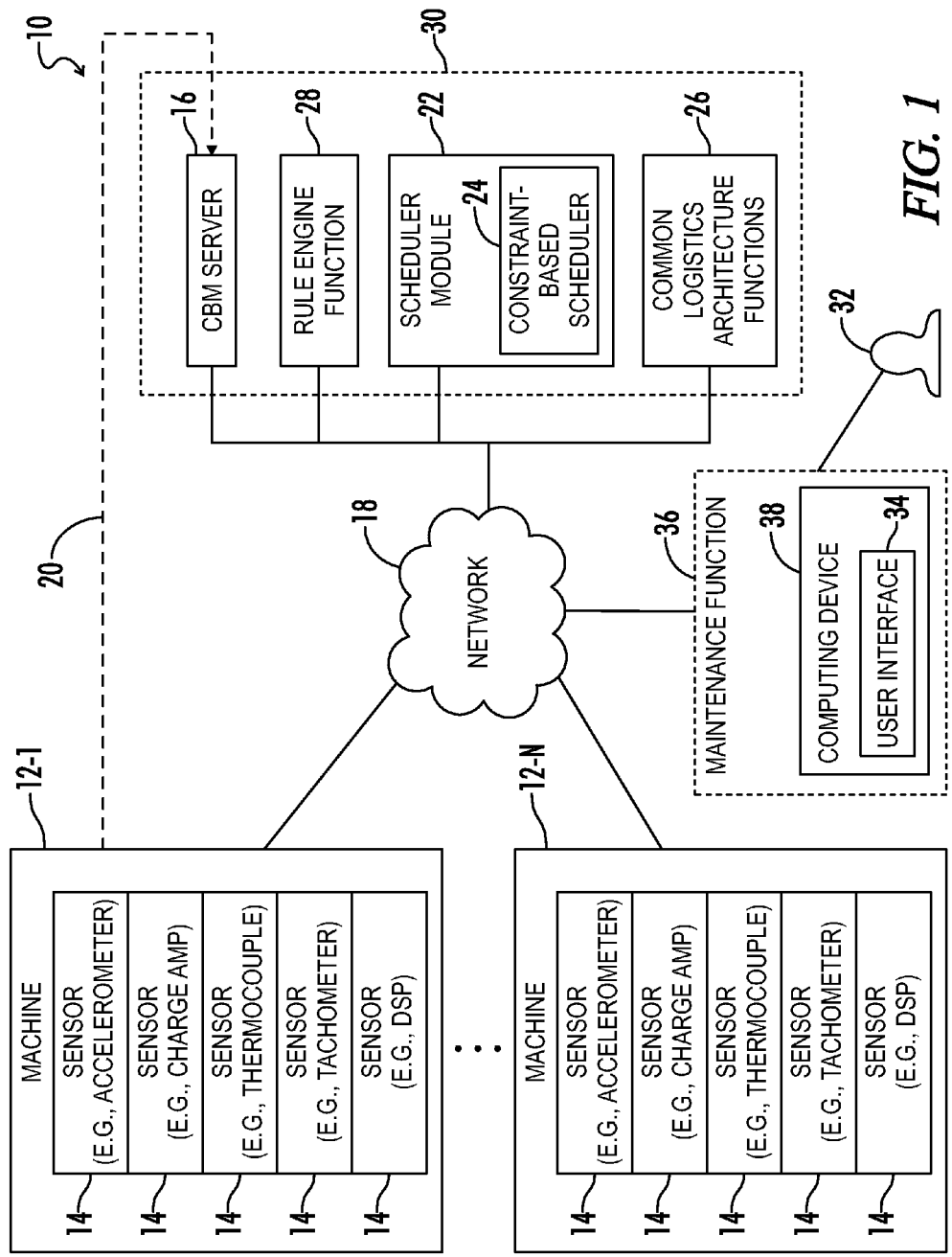
FIG. 1 is block diagram illustrating an exemplary system in which embodiments of the present disclosure may be practiced.

FIG. 1 is a block diagram of an exemplary system 10, in which embodiments of the present disclosure may be practiced. The system 10 includes a plurality of machines 12-1-12-N (generally, machines 12). While only two machines 12 are illustrated for clarity, any number of machines 12 may be used in conjunction with the subject matter of the present disclosure. The machines 12 may comprise any type of item that is made up of components and that is maintained, or otherwise serviced, from time to time. While the machines 12 may be mobile, there is no requirement that the machines 12 be mobile, and they may instead be used in a fixed location, such as the machines 12 used in a factory. By way of example only, the machines 12 may comprise vehicles, tanks, helicopters, planes, generators, workshop machinery, and the like.

The machines 12 each preferably include, or are coupled to, one or more sensors 14 that measure attributes or characteristics of the respective machine 12. Such sensors 14 may comprise, for example, an accelerometer, a charge amp, a thermocouple, a tachometer, a digital signal processor (DSP), or any other apparatus capable of measuring a desired attribute of the machine 12. Sensor data captured by the sensors 14 are provided to a condition-based maintenance (CBM) server 16 for analysis. Such sensor data typically quantifies a desired characteristic, such as a temperature, a frequency, a voltage level or a current level, of the respective machine 12. The sensor data may be maintained on the machine 12 and periodically provided to the CBM server 16, or may be continuously provided to the CBM server 16.

The sensor data may be provided to the CBM server 16 via one or more networks 18, or may be downloaded onto a separate storage medium, such as a flash drive or DVD, and provided to the CBM server 16 in that manner, as represented by the dashed arrow 20. The network 18 represents any type of wired or wireless network, or combination thereof, which may be used by a machine 12 for transmission of sensor data, and/or other data, to the CBM server 16.

The CBM server 16 comprises one or more computing devices and associated storage that analyzes inputs associated with the machines 12, and based on such inputs, the CBM server 16 then outputs condition-based information regarding a determined condition of the machine 12. Inputs may include, for example, the sensor data generated by the sensors 14, platform configuration data associated with the machines 12, maintenance history information of the machines 12, logistics status of the machines 12, operating history of the machines 12, and the like. Based on this information, the CBM server 16 generates outputs that may include a health evaluation of the machines 12, detected faults of the machines 12, predicted faults of the machines 12, and other prognostics. While the description herein has discussed the prognostics as relating to the machines 12, the prognostics may relate to particular components of the machines 12 as well. The CBM server 16 may comprise any desired technology for generating such information, such as a Bayesian-network-based prognostics module based on probabilities, or a neural network-based prognostics module. The outputs of the CBM server 16 identify a determined condition of a machine 12 or component thereof.

A scheduler module 22 receives various inputs, and based on the inputs, uses a constraint-based scheduler 24 to generate a maintenance schedule for the machines 12, or for components of the machines 12. In particular, the scheduler module 22 receives CBM information that is based on a determined condition of components of the machines 12, as determined by the CBM server 16. The scheduler module 22 also receives time-based maintenance information from common logistics architecture functions 26. The common logistics architecture functions 26 will be discussed in greater detail with respect to FIG. 3, but for purposes of FIG. 1, such common logistics architecture functions 26 generally provide information, in addition to the CBM information, to the scheduler module 22 to facilitate the generation of a maintenance schedule.

The time-based maintenance information may include, for example, one or more time-based work orders that identify maintenance tasks to be performed on components of the machines 12. Such time-based work orders may include, for example, resource information related to the maintenance task, such as a time domain that identifies how long the maintenance task should take, one or more parts that will be used in the maintenance task, labor criteria identifying a type of maintainer and/or number of maintainers for performing the maintenance task, and the like. Such time-based maintenance information is typically based on predetermined guidelines for preventive maintenance. For example, such guidelines may indicate that the machine 12-1 should have its oil changed every six months, or every 7,000 miles.

The scheduler module 22 processes the time-based maintenance information in conjunction with the CBM information. Such CBM data may include, for example, CBM work orders that are automatically generated by the CBM server 16, or by a rule engine function 28, based on the prognostic data generated by the CBM server 16. In particular, the rule engine function 28 may use rules to generate a CBM work order for a particular machine 12, or component thereof, based upon the prognostics from the CBM server 16. Such rules may be configured into the rule engine function 28 by an administrator based on a historical analysis of the prognostic information and how such information relates to a particular component or components. The rule engine function 28 may also determine a proper order for repairing components. In one embodiment, rule sets are written using Drools, a unified and integrated platform for rules, workflow and event processing. While the rule engine function 28 is depicted for purposes of illustration as being separate from the CBM server 16 and the scheduler module 22, the rule engine function 28 could also be integral with the CBM server 16 or the scheduler module 22, or a portion of the functionality could be implemented in either the CBM server 16 or the scheduler module 22. The CBM server 16, scheduler module 22, rule engine function 28 and common logistics architecture functions 26 may be at a location 30 that is remote from the machines 12, or may be at a location in proximity to the machines 12. Alternatively, the CBM server 16, scheduler module 22, rule engine function 28 and common logistics architecture functions 26 could be distributed at different locations, and may communicate with one another via the network 18.

The scheduler module 22 also receives constraints associated with providing maintenance of the machines 12, or components thereof. Constraints include any data that identifies a parameter within which the maintenance is to be performed. Constraints can include, for example, the number of available maintainers, the available maintainers who have a qualification status sufficient to perform the maintenance tasks, the work schedule of the available maintainers and work restrictions associated therewith (such as a certain maximum number of hours in a day or hours already worked during the week), the number and location of facilities for performing the maintenance, the time frames during which such facilities may be available, precedence constraints identifying a necessary order of maintenance when multiple components are being serviced, and the like.

Based on this information, the scheduler module 22 uses the constraint-based scheduler 24 to generate a maintenance schedule for one or more components of the machines 12. The maintenance schedule may be presented to an operator 32 in a user interface 34, it may be printed, and/or it may be stored in a storage medium for later review.

Figure 2:
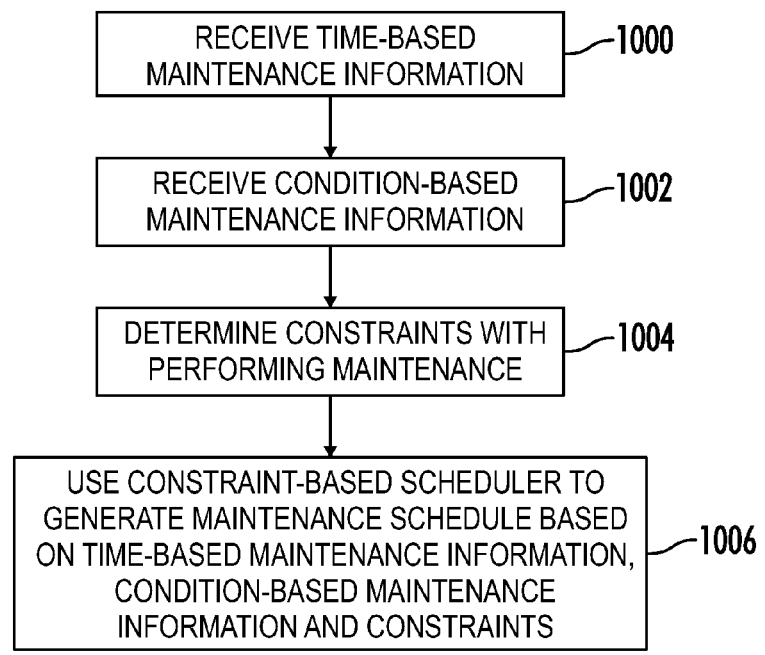
FIG. 2 is a flowchart illustrating an exemplary process for generating a maintenance schedule according to one embodiment.

FIG. 2 is a flowchart illustrating an exemplary process for generating a maintenance schedule according to one embodiment, and will be discussed in conjunction with FIG. 1. Assume that an operator 32, associated with a maintenance function 36, desires to generate a maintenance schedule. In particular, the operator 32 may be responsible for generating maintenance schedules for the maintainers at a particular facility. The operator 32 operates a computing device 38, which includes a user interface 34 that facilitates the reception of input from the operator 32 and presentation of information to the operator 32. The operator 32 identifies, via the user interface 34, a desire to generate a maintenance schedule for the machines 12-1-12-N, which may be physically located at a facility for which the operator 32 is responsible. The computing device 38 communicates with the scheduler module 22 via the network 18 based on the input of the operator 32. While the computing device 38 is shown for purposes of illustration to be remote from the location 30, in other embodiments the computing device 38 may be colocated with the scheduler module 22, or the scheduler module 22 may be integral with the computing device 38.

The scheduler module 22, upon receiving the input from the computing device 38, receives time-based maintenance information from the common logistics architecture functions 26 associated with at least one component on the machine 12-1 (FIG. 2, step 1000). In particular, the time-based maintenance information comprises a time-based work order that indicates that the component needs to be serviced based on a predetermined guideline for servicing such component. The scheduler module 22 also receives CBM information that is based on a determined condition of the at least one component from the rule engine function 28 (FIG. 2, step 1002). In particular, the time-based maintenance information comprises a CBM work order that indicates that the component should be serviced and is based on a determined condition identified by the CBM server 16.

The scheduler module 22 also determines constraints associated with performing the maintenance tasks identified in the time-based work order and the CBM work order (FIG. 2, step 1004). Such constraints may be provided to the scheduler module 22, for example, by the common logistics architecture functions 26. For example, the scheduler module 22 determines a precedence constraint that indicates the maintenance task identified in the time-based work order should be performed prior to the maintenance task identified in the CBM work order. Other constraints may identify that the maintenance task identified by the time-based work order may be performed by a level 2 maintainer, and the maintenance task identified by the CBM work order must be performed by at least a level 4 maintainer, due to the different complexities associated with the maintenance tasks.

The scheduler module 22 then uses the constraint-based scheduler 24 to generate a maintenance schedule for the at least one component based on the time-based maintenance information, the CBM information, and the constraints (FIG. 2, step 1006). The scheduler module 22 provides the maintenance schedule to the computing device 38 for presentation to the operator 32 via the user interface 34. The scheduler module 22 may be executed for multiple machines 12 and components thereof or for a single machine 12. As will be discussed in greater detail herein, different optimization criteria can be selected by the operator 32 to indicate a desired optimization, or priority, to be used by the constraint-based scheduler 24 to generate the maintenance schedule. For example, the operator 32 could indicate a priority for proximity to a maintenance facility, availability of all parts, immediate need for the particular machine 12, etc. Because the scheduler module 22 can be run anytime by the operator 32, or automatically at a predefined time interval, the most deserving candidates can be selected for maintenance at a given time.

Figure 3:
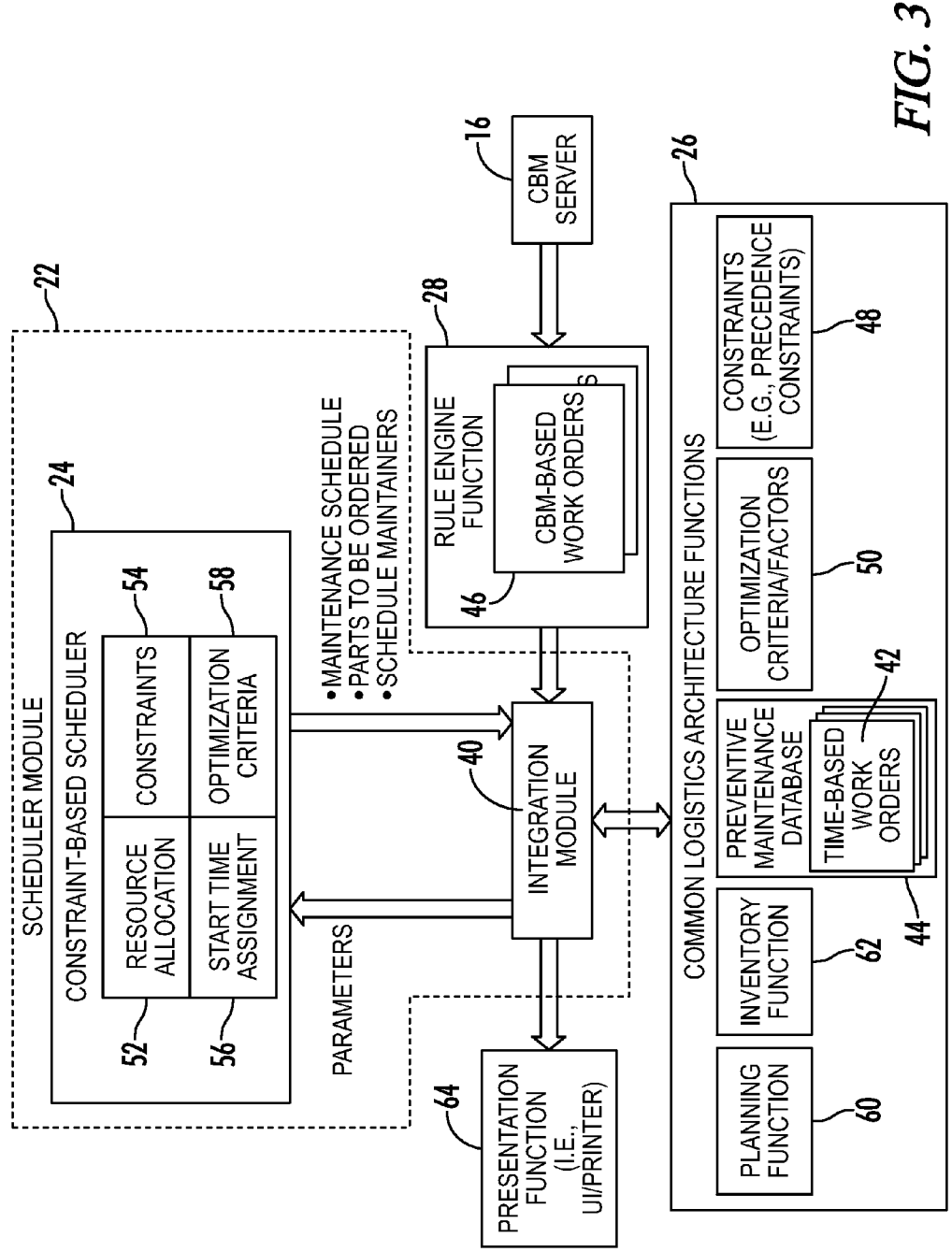
FIG. 3 is a block diagram illustrating an exemplary architecture suitable for implementing aspects of the present disclosure, including certain components illustrated in FIG. 2 in greater detail.

FIG. 3 is a block diagram illustrating an exemplary architecture suitable for implementing aspects of the present disclosure, including certain components illustrated in FIG. 2 in greater detail. The scheduler module 22 includes an integration module 40 that receives the time-based maintenance information from the common logistics architecture functions 26, and the CBM information from the rule engine function 28. The time-based maintenance information may comprise one or more time-based work orders 42 stored in a preventive maintenance database 44. As discussed previously, the time-based work orders 42 may be generated manually, or automatically, based on predetermined guidelines. The CBM information comprises in one embodiment a plurality of CBM work orders 46. The CBM work orders 46 are generated by the rule engine function 28 based on the determined condition of the components, or machines 12, as determined by the CBM server 16.

In one embodiment, the integration module 40 reconciles the time-based maintenance information with the CBM information. Such reconciliation may comprise a number of different functions. The integration module 40 may determine that a time-based work order 42 identifies a same maintenance task as that identified by a CBM work order 46. In response to this determination, the integration module 40 may delete either the time-based work order 42 or the CBM work order 46 to eliminate duplicate work orders. The integration module 40 may also determine that a time-based work order 42 identifies a first maintenance task associated with a component, and a CBM work order 46 identifies a second maintenance task associated with the component. In response to this determination, the integration module 40 may merge the two work orders into a single work order, thereby eliminating one of the two work orders. The integration module 40 may also generate prioritization information for use by the constraint-based scheduler 24 that identifies certain work orders as having a higher priority than other work orders. For example, the integration module 40 may generate prioritization information that categorizes a CBM work order 46 that indicates that a first component should be replaced on a machine 12 as a higher priority than a time-based work order 42 that indicates a second component on the machine 12 should undergo routine time-based preventive maintenance.

In one embodiment, CBM information generated by the CBM server 16 may be used to alter time-based maintenance information retained in the preventive maintenance database 44. For example, the prognostic data generated by the CBM server 16 may indicate that a particular component is healthy. Such information may be used by the rule engine function 28 or the integration module 40 to alter time-based information maintained in the preventive maintenance database 44. For example, a time-based work order 42, maintained in the preventive maintenance database 44, that identifies a maintenance task for the particular component may be altered such that the particular component is scheduled for the maintenance at a later date based on the determination that the particular component is healthy.

Figure 4:
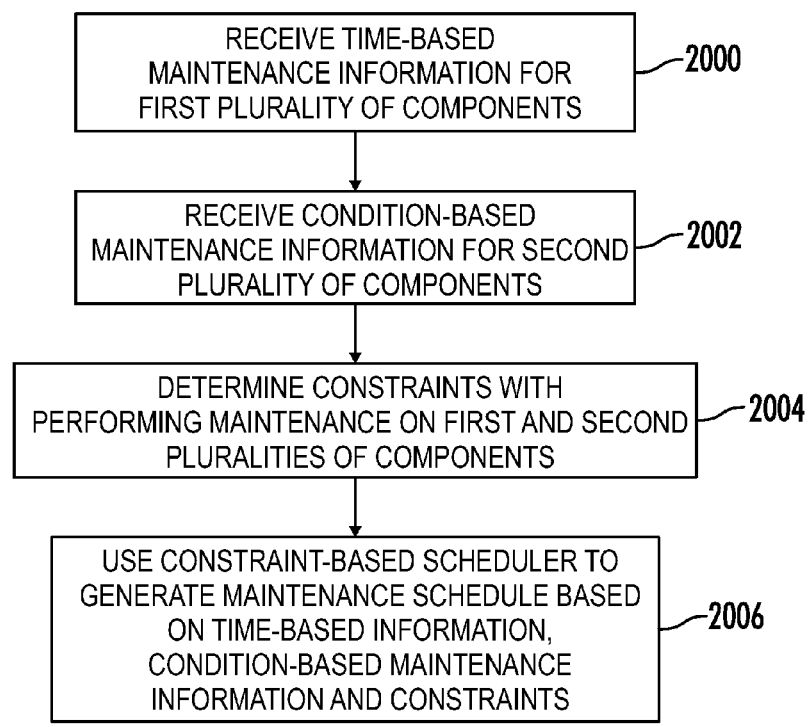
FIG. 4 is a flowchart illustrating an exemplary process for generating a maintenance schedule according to another embodiment.

FIG. 4 is a flowchart illustrating an exemplary process for generating a maintenance schedule according to another embodiment, and will be discussed in conjunction with FIG. 3. In this embodiment, assume that a plurality of components in a plurality of machines 12 (FIG. 1) have been identified for either CBM maintenance or time-based maintenance. The integration module 40 receives time-based maintenance information from the common logistics architecture functions 26 relating to a first plurality of components (FIG. 4, step 2000). In particular, the integration module 40 receives a plurality of time-based work orders 42, each of which identifies a maintenance task to be performed on a particular component in a first plurality of components. Each time-based work order 42 may include, for example, relevant resources for the corresponding maintenance task. Such resources may, but not necessarily, include a time domain that identifies an amount of time it should take to perform the maintenance, one or more parts that may be necessary for the maintenance task, and an identification of a maintainer criterion that is associated with a particular skill set necessary to perform the maintenance task.

The integration module 40 also receives CBM information relating to a second plurality of components (FIG. 4, step 2002). The CBM information may comprise, for example, a plurality of CBM work orders 46, each of which is based on a determined condition of one of the second plurality of components. The CBM work orders 46 may each identify a maintenance task to be performed on a particular component in a second plurality of components, and may identify, for example, relevant resources for the corresponding maintenance task. The integration module 40 may prioritize the plurality of CBM work orders 46 with respect to the plurality of time-based work orders 42 to generate a prioritized list of work orders.

The integration module 40 determines one or more constraints 48 associated with performing the maintenance on the first and second pluralities of components (FIG. 4, step 2004). The constraints 48 may be identified in the common logistics architecture functions 26 or elsewhere, and may be configured or otherwise identified by, for example, the operator 32 (FIG. 1). Alternatively, one or more of the constraints 48 may be entered in the user interface 34 by the operator 32 as part of the request to the scheduler module 22 to generate the maintenance schedule. As discussed above, the constraints 48 identify parameters within which the maintenance tasks are to be performed. Such constraints 48 may include, for example, the number of facilities available for performing the maintenance tasks, limited timeframes at such facilities for performing the maintenance tasks, limitations on which maintainers are qualified to perform such maintenance tasks, precedence constraints that identify a particular order of maintenance of components, minimum and maximum gaps among maintenance tasks, non-availability of certain resources, and the like.

The integration module 40 provides the time-based maintenance information, the CBM information and the constraints 48 to the constraint-based scheduler 24 for use in generating a maintenance schedule for the plurality of machines 12 (FIG. 4, step 2006).

In one embodiment, the integration module 40 also provides optimization criteria 50 to the constraint-based scheduler 24 for use in generating the maintenance schedule. Optimization criteria 50 can be used to identify a preferred criteria, or factor, for consideration in the generation of the maintenance schedule. For example, optimization criteria 50 can indicate that the preferred maintenance schedule utilizes the fewest number of maintainers; that the preferred maintenance schedule spreads the workload evenly over a number of maintainers (i.e., level loading); that the preferred maintenance schedule prioritizes the shortest time duration for all maintenance tasks, irrespective of cost or labor; that the preferred maintenance schedule prioritizes the least cost resources; or that the preferred maintenance schedule accommodates the most tasks provided in a particular time window. The optimization criteria 50 may be configured in the common logistics architecture functions 26. Alternatively, the optimization criteria 50 may be selected in real time by the operator 32 via the user interface 34 (FIG. 1). Thus, the operator 32 may successively generate maintenance schedules for the same maintenance tasks using different optimization criteria 50 to select a desired maintenance schedule.

The constraint-based scheduler 24 then operates to generate a maintenance schedule. In one embodiment, the operation of the constraint-based scheduler 24 can be broadly described in four phases. The constraint-based scheduler 24 considers the resources that are available, and those that are unavailable (block 52). Resources can include facilities, maintainers, parts and the like. The constraint-based scheduler 24 also considers the constraints (block 54). Constraints, as discussed previously, can comprise practically any parameter within which the maintenance is to be performed, such as the level of the maintainer, the number of facilities available for performing the maintenance tasks, limited time-frames at such facilities for performing the maintenance tasks, limitations on which maintainers are qualified to perform such maintenance tasks, and the like. The constraint-based scheduler 24 then determines start times for available maintainers at the appropriate facilities that comply with the resources, constraints, and if selected, optimization criteria (blocks 56-58). The constraint-based scheduler 24 may be developed using hardware, firmware, software, or a combination thereof. In one embodiment the constraint-based scheduler 24 comprises a finite domain constraint-based platform written in C++ using Gecode.

The output from the constraint-based scheduler 24 may include the maintenance schedule, an identification of the parts to be used, the identification of the maintainers who have been scheduled, and the like. The maintenance schedule may identify, for example, for each of the components, a start time of a corresponding maintenance task, an end time of the corresponding maintenance task, a particular maintainer of a plurality of maintainers for performing the corresponding maintenance task, the facility at which the task is to be performed, and the like.

The generated maintenance schedule can be stored in a database, and also provided to the operator 32 (FIG. 1) via a presentation function 64. The presentation function 64 represents any desired mechanism for presenting the maintenance schedule to the operator 32, such as via a printer, or via the user interface 34, or the like.

In one embodiment, the scheduler module 22 can automatically interact with other systems, such as a planning function 60 or an inventory function 62, in accordance with the generated maintenance schedule. For example, the scheduler module 22 may determine that a particular part is not available, and will then automatically generate a message to the inventory function 62 that indicates a need to order the particular part. Alternatively, the scheduler module 22 may determine that a particular part is not available, and automatically generate a message that orders the particular part. The scheduler module 22 may also generate and send messages to the planning function 60 to schedule maintainers per the maintenance schedule.

Figure 5:
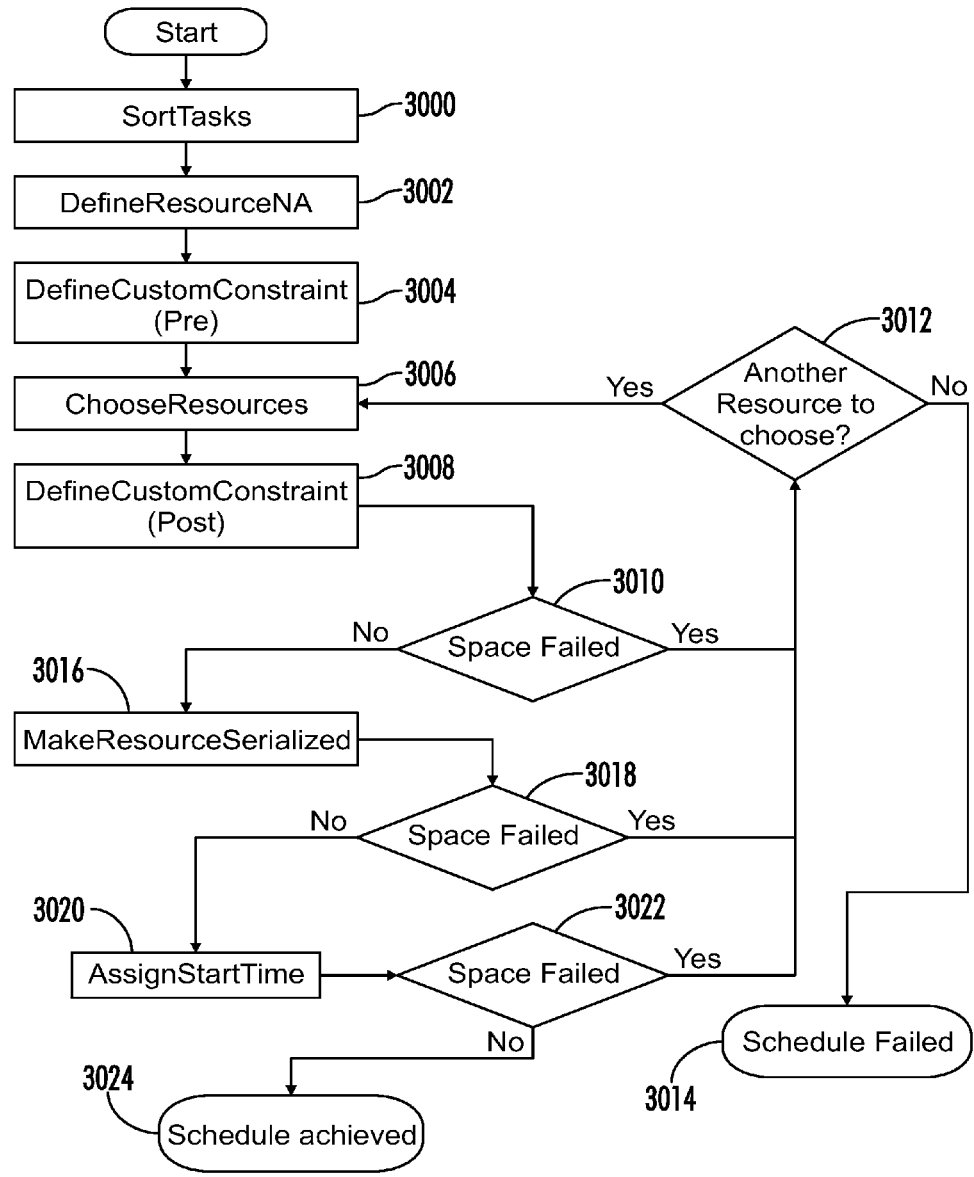
FIG. 5 is a flowchart illustrating an exemplary process by which the scheduler module generates a maintenance schedule, according to one embodiment.

FIG. 5 is a flowchart illustrating an exemplary process by which the constraint-based scheduler 24 generates a maintenance schedule, according to one embodiment. The process begins by sorting the maintenance tasks identified in the work orders according to the prioritization criteria, such as sorting the CBM-based work orders 46 at a higher priority than the time-based work orders 42 (FIG. 5, step 3000). The constraint-based scheduler 24 then determines which resources are not available for use at various times in determining the maintenance schedule (FIG. 5, step 3002). This can be determined, in part, from information available in the common logistics architecture functions 26. The constraint-based scheduler 24 then determines any pre-constraints (FIG. 5, step 3004). Pre-constraints may comprise, for example, data indicating that a certain task may precede another task, that there must be a certain minimum gap between two consecutive tasks, that a succeeding task must be started within a certain maximum time after preceding tasks, and the like. The constraint-based scheduler 24 then begins an iterative process of selecting resources, such as a desired maintainer for a desired maintenance task (FIG. 5, step 3006) such that the selection satisfies each of the pre-constraints.

For each selected resource, the constraint-based scheduler 24 determines whether this resource complies with a post-constraint (FIG. 5, step 3008). A post-constraint may comprise, for example, a usage constraint that precludes a maintainer from being scheduled more than a certain number of hours for a particular task in a consecutive 24 hour period, a non-availability constraint that indicates that a maintainer is not available during night shifts, and the like. Those of skill in the art will appreciate that pre- and post-constraints are interchangeable such that each of the pre-constraints can be defined as a post-constraint or vice versa. Pre-constraints are defined prior to resource selections (i.e., a particular maintainer, a particular part, etc.) being determined, while post constraints are defined after the resource selections. Implementations and executions of the constraints may vary based on whether they are pre- or post-constraints. Defining as a pre-constraint consumes more memory whereas defining as a post-constraint may consume more CPU time. Thus the selection of a constraint as a pre- or post-constraint is a balance such that the scheduler module 22 does not consume excessive memory or excessive CPU time. If the resource does not satisfy the post-constraint step, it is determined whether there is another resource to choose (FIG. 5, steps 3010-3012). If there is another available resource, the next resource is chosen (FIG. 5, step 3006). If not, and the maintenance schedule is not complete, then the constraint-based scheduler 24 is not able to generate the maintenance schedule (FIG. 5, step 3014).

If the selection of the resource did comply with the post-constraint, then the resource is serialized (FIG. 5, step 3016) so that no single maintainer or facility exceeds their capacity at a given time. If the resource could not be serialized, then it is determined whether another resource is available (FIG. 5, steps 3018, 3012). If the resource could be serialized, then a start time for the resource, such as a maintainer, is assigned (FIG. 5, step 3020). A start time is allocated based on the earliest time availability of the resources. Since start times are also domains, the constraint-based scheduler 24 will iteratively try a next available time until a start time can be allocated, or if no start time can be allocated, then it is determined whether another resource is available (FIG. 5, steps 3022-3012). If a start time is successfully assigned to the resource, then a maintenance schedule is achieved (FIG. 5, step 3024). While FIG. 5 has only been discussed with regard to a single maintenance task, the process would typically be performed for a plurality of maintenance tasks simultaneously at each step discussed above. For example, if the resource cannot be chosen for each maintenance task at step 3006, then the process may stop without proceeding to step 3008.

The constraint-based scheduler 24 may continue to achieve different schedules by choosing different resources and different start times as long as the search tree is not fully explored. However, only those solutions having a cost that is better than a prior solution may be returned. For example, if the operator 32 desires a schedule based on level loading of resources, a first determined schedule may not be ideally level loaded though it satisfies all the constraints. If a subsequent determined schedule produces a second schedule that is more ideally level loaded than the first schedule, the constraint-based scheduler 24 may return the second determined schedule instead of the first determined schedule. For a large schedule, the operator 32 may opt to terminate a search after a preferred number of solutions are achieved (e.g., determined schedules) or may be able to provide a maximum time limit for the process. While the constraint-based scheduler 24 preferably develops the best schedule during the initial iteration, based on the particular specifics of the parameters provided to the constraint-based scheduler 24, such an iterative approach will sometimes determine a preferable schedule after multiple iterations.

Figure 6:
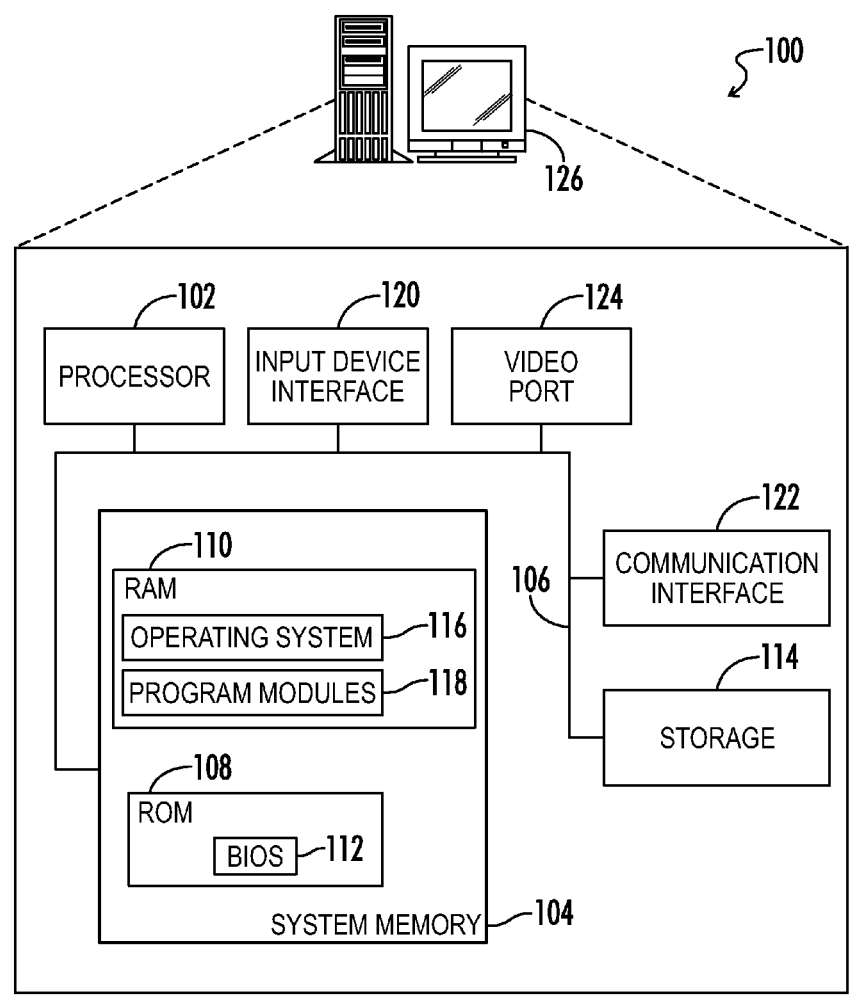
FIG. 6 is a block diagram illustrating a computing device suitable for implementing the scheduler module according to one embodiment.

FIG. 6 is a block diagram illustrating an exemplary computing device 100 suitable for implementing the scheduler module 22 according to one embodiment. The computing device 100 may comprise any computing or processing device capable of executing software instructions to implement the functionality described herein, such as a work station, a desktop or laptop computer, a tablet computer, or the like. The computing device 100 includes a processor 102, a system memory 104, and a system bus 106. The system bus 106 provides an interface for system components including, but not limited to, the system memory 104 and the processor 102. The processor 102 can be any commercially available or proprietary processor. Dual microprocessors and other multi-processor architectures may also be employed as the processor 102.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read only memory (ROM), erasable programmable read only memory (EPROM), electrically erasable programmable read only memory (EEPROM), etc.) and/or volatile memory 110 (e.g., random access memory (RAM)). A basic input/output system (BIOS) 112 may be stored in the non-volatile memory 108, and can include the basic routines that help to transfer information between elements within the computing device 100. The volatile memory 110 may also include a high-speed RAM such as static RAM for caching data.

The computing device 100 may further include a computer-readable storage 114, which may comprise, for example, an internal hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 114 and other drives, associated with computer-readable and computer-usable media, provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 114 and in the volatile memory 110, including an operating system 116 and one or more program modules 118, which may implement the functionality described herein in whole or in part, including, for example, functionality associated with the scheduler module 22, the constraint-based scheduler 24, the integration module 40, and other processing and functionality described herein. It is to be appreciated that the embodiments can be implemented with various commercially available operating systems 116 or combinations of operating systems 116.

All or a portion of the embodiments may be implemented as a computer program product stored on a transitory or non-transitory computer-usable or computer-readable storage medium, such as the computer-readable storage 114, which includes complex programming instructions, such as complex computer-readable program code, configured to cause the processor 102 to carry out the steps described herein. Thus, the computer-readable program code can comprise software instructions for implementing the functionality of the embodiments described herein when executed on the processor 102. The processor 102, in conjunction with the program modules 118 in the volatile memory 110, may serve as a control system for the computing device 100 that is configured to, or adapted to, implement the functionality described herein.

A user, such as the operator 32, may be able to enter commands and information into the computing device 100 through one or more input devices, such as, for example, a keyboard (not illustrated); a pointing device, such as a mouse (not illustrated); or a touch-sensitive surface. Other input devices may include a microphone, an infrared (IR) remote control, a joystick, a game pad, a stylus pen, or the like. These and other input devices may be connected to the processor 102 through an input device interface 120 that is coupled to the system bus 106, but can be connected by other interfaces such as a parallel port, an IEEE 1394 serial port, a Universal Serial Bus (USB) port, an IR interface, etc.

The computing device 100 may also include a communication interface 122 suitable for communicating with the network 18. The computing device 100 may also include a video port 124 interfaces with a display 126 that provides information to the operator 32 via, for example, the user interface 34.

Among other features, the scheduler module 22 disclosed herein assimilates multiple time-based work orders 42 and CBM-based work orders 46, determines dependencies and relationships between such work orders, and reconciles such work orders to, for example, eliminate duplicative work orders. Based on this information and the constraints associated with performing maintenance on machines 12, (such as available facilities, location of the machines, availability of maintainers, availability of parts, and/or desired time frame for performing the maintenance), generates a maintenance schedule upon demand. The scheduler module 22 disclosed herein may be repeatedly executed using different optimization criteria 50 to generate different maintenance schedules for the same components, resulting in a maintenance schedule based on desired criteria.

Those skilled in the art will recognize improvements and modifications to the embodiments of the present disclosure. All such improvements and modifications are considered within the scope of the concepts disclosed herein and the claims that follow.

What is claimed is:

1. A method for generating a maintenance schedule for a plurality of components associated with a plurality of machines, the method comprising:
    receiving, by a processing device, time-based maintenance information comprising a plurality of time-based work orders that originate from a first source and that identify maintenance tasks to be performed on a first plurality of components of the plurality of components;
    receiving, by the processing device, condition-based maintenance information comprising a plurality of condition-based maintenance work orders that originate from a second source and that identify maintenance tasks to be performed on a second plurality of components of the plurality of components based on sensed conditions of the second plurality of components;
    making a determination, by the processing device, that one of the plurality of time-based work orders and one of the plurality of condition-based maintenance work orders identify a maintenance task on a component of a same machine;
    altering the one of the plurality of time-based work orders or the one of the plurality of condition-based maintenance work orders based on the determination;
    determining a plurality of constraints associated with performing maintenance on the plurality of components; and
    generating, using a constraint-based scheduler, the maintenance schedule for the plurality of components based on the time-based maintenance information, the condition-based maintenance information, and the plurality of constraints.

2. The method of claim 1, further comprising generating prioritization information that prioritizes the condition-based maintenance information as having a higher priority than the time-based maintenance information, and wherein generating, using the constraint-based scheduler, the maintenance schedule based on the time-based maintenance information, the condition-based maintenance information, and the plurality of constraints further comprises:
    generating, using the constraint-based scheduler, the maintenance schedule based on the time-based maintenance information, the condition-based maintenance information, the plurality of constraints, and the prioritization information.

3. The method of claim 1, wherein the time-based maintenance information is stored in a preventive maintenance database, the method further comprising:
    altering a time-based work order stored in the preventive maintenance database that identifies a maintenance task to be performed at a first date to reschedule the maintenance task to be performed at a second date based on the condition-based maintenance information.

4. The method of claim 1, further comprising:
    determining, based on the time-based maintenance information or the condition-based maintenance information, a need for a particular part;
    determining that the particular part is not in stock; and
    automatically generating a message that indicates the need to order the particular part.

5. The method of claim 1, further comprising:
    determining, by the processing device, at least one maintenance schedule optimization criterion comprising one of a group including a least cost criterion, a fewest mechanics criterion, and a shortest time frame criterion; and
    wherein generating, using the constraint-based scheduler, the maintenance schedule based on the time-based maintenance information, the condition-based maintenance information, and the plurality of constraints further comprises:
    generating, using the constraint-based scheduler, the maintenance schedule based on the time-based maintenance information, the condition-based maintenance information, the plurality of constraints, and the at least one maintenance schedule optimization criterion, wherein the maintenance schedule satisfies the at least one maintenance schedule optimization criterion.

6. The method of claim 1, wherein the condition-based maintenance information further comprises probability information identifying a probability that at least one component requires maintenance.

7. The method of claim 1, wherein altering the one of the plurality of time-based work orders or the one of the plurality of condition-based maintenance work orders based on the determination comprises deleting the one of the plurality of time-based work orders or the one of the plurality of condition-based maintenance work orders.

8. The method of claim 1, wherein the plurality of constraints comprises a precedence constraint identifying a precedence of maintenance with respect to at least two components from the plurality of components, and a resource constraint identifying a finite number of resources associated with performing maintenance on the plurality of components.

9. The method of claim 1, wherein altering the one of the plurality of time-based work orders or the one of the plurality of condition-based maintenance work orders based on the determination comprises
merging the one of the plurality of time-based work orders and the one of the plurality of condition-based maintenance work orders into a merged work order, thereby eliminating the one of the plurality of time-based work orders or the one of the plurality of condition-based maintenance work orders.

10. The method of claim 1, wherein each of the plurality of time-based work orders identifies relevant resources for performing the respective maintenance task including a time domain, a part, and a maintainer criterion,
and each of the plurality of condition-based maintenance work orders identifies relevant resources for performing the respective maintenance task including a time domain, a part and a maintainer criterion; and
wherein generating, using the constraint-based scheduler, the maintenance schedule for the plurality of components based on the time-based maintenance information, the condition-based maintenance information, and the plurality of constraints further comprises:
generating, using the constraint-based scheduler, the maintenance schedule for the plurality of components based on the plurality of time-based work orders, the plurality of condition-based maintenance work orders, and the plurality of constraints, wherein the maintenance schedule identifies, for each of the plurality of components, a start time of a corresponding maintenance task, an end time of the corresponding maintenance task, and a particular maintainer of a plurality of maintainers for performing the corresponding maintenance task.

11. The method of claim 1, wherein altering the one of the plurality of time-based work orders or the one of the plurality of condition-based maintenance work orders based on the determination comprises assigning the one of the plurality of condition-based maintenance work orders a higher prioritization than the one of the plurality of time-based work orders.

12. A method for generating a maintenance schedule for a plurality of components, the method comprising:
receiving, by a processing device, a plurality of time-based work orders, each of the plurality of time-based work orders originating from a first source and identifying a maintenance task to be performed on a corresponding component of the plurality of components;
receiving, by the processing device, a plurality of condition-based maintenance work orders, each of the plurality of condition-based maintenance work orders originating from a second source and identifying a maintenance task to be performed on a corresponding component of the plurality of components based on sensed conditions of the plurality of components;
making a determination, by the processing device, that one of the plurality of time-based work orders and one of the plurality of condition-based maintenance work orders identify a maintenance task on a same component;
altering the one of the plurality of time-based work orders or the one of the plurality of condition-based maintenance work orders based on the determination;
prioritizing the plurality of condition-based maintenance work orders with respect to the plurality of time-based work orders to generate a prioritized list of work orders;
determining a plurality of constraints associated with performing the maintenance tasks; and
generating, using a constraint-based scheduler, the maintenance schedule for the plurality of components based on the prioritized list of work orders.

13. The method of claim 12, wherein altering the one of the plurality of time-based work orders or the one of the plurality of condition-based maintenance work orders based on the determination comprises:
merging the one of the plurality of condition-based maintenance work orders with the one of plurality of time-based work orders to create a merged work order.

14. A computing device configured to generate a maintenance schedule for a plurality of components associated with a plurality of machines, comprising:
a communication interface configured to communicate with a network; and
a processor coupled to the communication interface and configured to:
receive time-based maintenance information comprising a plurality of time-based work orders originating from a first source and that identify maintenance tasks to be performed on a first plurality of components of the plurality of components;
receive condition-based maintenance information comprising a plurality of condition-based maintenance work orders originating from a second source and that identify maintenance tasks to be performed on a second plurality of components of the plurality of components based on sensed conditions of the second plurality of components;
make a determination that one of the plurality of time-based work orders and one of the plurality of condition-based maintenance work orders identify a maintenance task on a component of a same machine;
alter the one of the plurality of time-based work orders or the one of the plurality of condition-based maintenance work orders based on the determination;
determine a plurality of constraints associated with performing maintenance on the plurality of components; and
generate, using a constraint-based scheduler, the maintenance schedule for the plurality of components based on the time-based maintenance information, the condition-based maintenance information, and the plurality of constraints.

15. The computing device of claim 14, wherein the processor is further configured to:
generate prioritization information that prioritizes the condition-based maintenance information as having a higher priority than the time-based maintenance information, and wherein to generate, using the constraint-based scheduler, the maintenance schedule based on the time-based maintenance information, the condition-based maintenance information, and the plurality of constraints the processor is further configured to:

generate, using the constraint-based scheduler, the maintenance schedule based on the time-based maintenance information, the condition-based maintenance information, the plurality of constraints, and the prioritization information.

16. The computing device of claim 14, wherein the time-based maintenance information is stored in a preventive maintenance database, the processor being further configured to:

based on the condition-based maintenance information, alter a time-based work order stored in the preventive maintenance database to specify that at least one component should be scheduled for preventive maintenance at a later date that is subsequent to an original date on which the at least one component was scheduled for the preventive maintenance prior to altering the time-based work order.

17. The computing device of claim 14, wherein the processor is further configured to:

determine at least one maintenance schedule optimization criterion comprising a criterion selected from a group including a least cost criterion, a fewest mechanics criterion, and a shortest time frame criterion; and wherein to generate, using the constraint-based scheduler, the maintenance schedule based on the time-based maintenance information, the condition-based maintenance information, and the plurality of constraints the processor is further configured to:

generate, using the constraint-based scheduler, the maintenance schedule based on the time-based maintenance information, the condition-based maintenance information, the plurality of constraints, and the at least one maintenance schedule optimization criterion, wherein the maintenance schedule satisfies the at least one maintenance schedule optimization criterion.

18. A computer program product for generating a maintenance schedule for a plurality of components associated with a plurality of machines, the computer program product stored on a non-transitory computer-readable storage medium and including instructions configured to cause a processor to carry out the steps of:

receiving time-based maintenance information comprising a plurality of time-based work orders originating from a first source and that identify maintenance tasks to be performed on a first plurality of components of the plurality of components;

receiving condition-based maintenance information comprising a plurality of condition-based maintenance work orders originating from a second source and that identify maintenance tasks to be performed on a second plurality of components of the plurality of components based on sensed conditions of the second plurality of components;

making a determination that one of the plurality of time-based work orders and one of the plurality of condition-based maintenance work orders identify a maintenance task on a component of a same machine;

altering the one of the plurality of time-based work orders or the one of the plurality of condition-based maintenance work orders based on the determination;

determining a plurality of constraints associated with performing maintenance on the plurality of components; and generating the maintenance schedule for the plurality of components based on the time-based maintenance information, the condition-based maintenance information, and the plurality of constraints.

\* \* \* \* \*